United States Patent
Tsai et al.

(10) Patent No.: US 8,582,221 B2
(45) Date of Patent: Nov. 12, 2013

(54) LENS MODULE HAVING A SQUARE LENS

(75) Inventors: Meng-Yu Tsai, New Taipei (TW); Rong-Jhe Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 108 days.

(21) Appl. No.: 13/413,542

(22) Filed: Mar. 6, 2012

(65) Prior Publication Data

US 2013/0163096 A1    Jun. 27, 2013

(30) Foreign Application Priority Data

Dec. 21, 2011  (TW) .............................. 100147585 A

(51) Int. Cl.
  *G02B 7/02* (2006.01)
  *G02B 7/04* (2006.01)
(52) U.S. Cl.
  CPC ....................................... *G02B 7/04* (2013.01)
  USPC .......................................... 359/823; 359/819

(58) Field of Classification Search
  USPC .................................. 359/811, 819, 823, 829
  See application file for complete search history.

(56) References Cited

U.S. PATENT DOCUMENTS

2011/0002056 A1*    1/2011    Ko ................................. 359/823

\* cited by examiner

*Primary Examiner* — William Choi
(74) *Attorney, Agent, or Firm* — Altis & Wispro Law Group, Inc.

(57) ABSTRACT

A lens module includes a holder defining a cavity and a barrel retained within the cavity, and includes a first optical axis X aligned with an imaginary axis of the cavity, a frame defining a through hole and comprising several blocking portions, and a square lens possessing a second optical axis Y. The frame is coupled to the holder, and an imaginary axis of the through hole is aligned with the axis of the cavity. The square lens is connected to the frame and includes four side surfaces abutting the several blocking portions, which precisely aligns the second optical axis Y with the imaginary axis of the through hole.

7 Claims, 3 Drawing Sheets

LENS MODULE HAVING A SQUARE LENS

BACKGROUND

1. Technical Field

The present disclosure relates to a lens module and, more particularly, to a lens module having a square lens.

2. Description of Related Art

Many portable electronic devices, such as cell phones, notebooks and personal digital assistants (PDA) contain a digital camera. Lens modules used in digital camera modules typically include a barrel, a number of optical elements received in the barrel, and at least one lens, e.g. a liquid crystal lens with a variable focal length, extending out of the barrel. When assembling the lens outside the barrel using automatic machines, it's a great of cost and the automatic machines takes to much room. When assembled manually, the optical axis of the lens outside the barrel is very easily misaligned with that of the optical elements received in the barrel, and the imaging quality of the lens module is correspondingly affected. Furthermore, the processing and manufacture of round lenses is more complex and difficult than the same processes in relation to square lenses.

What is needed is a lens module providing a structure to help to manually assembly the square lens outside the barrel.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are described with reference to the accompanying drawings.

Figure 1:
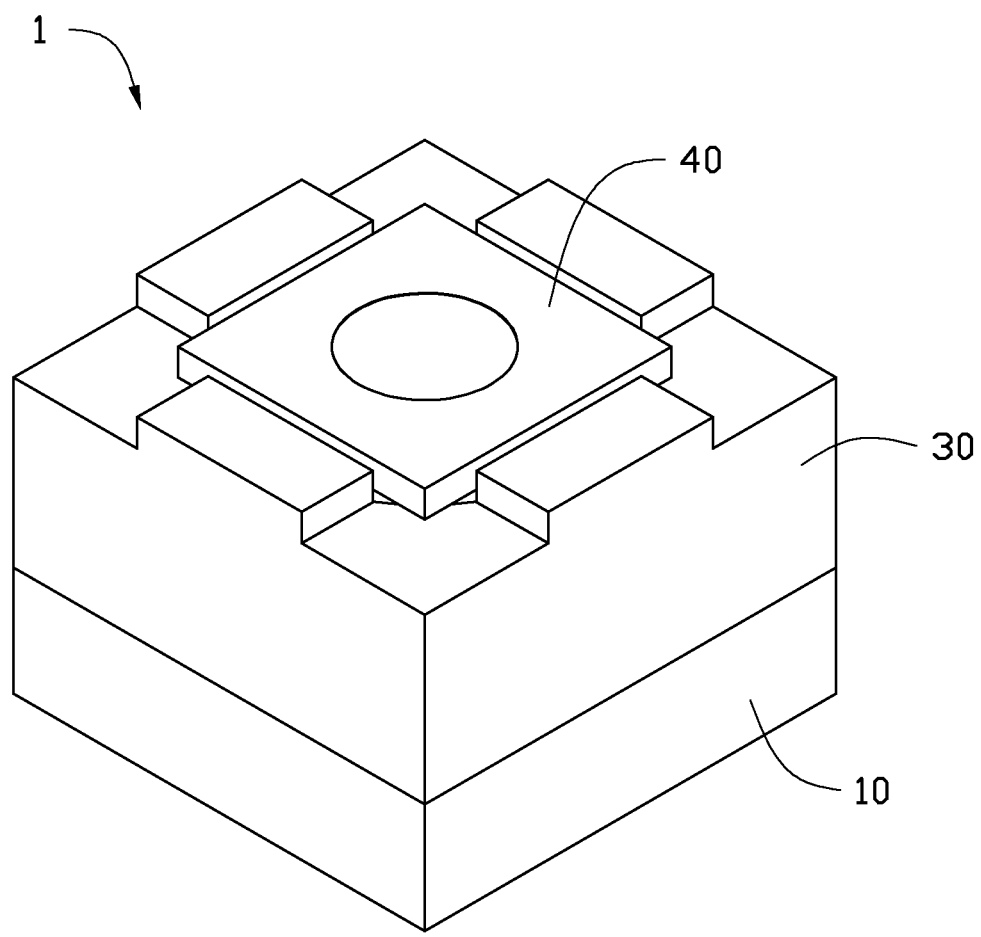
FIG. 1 is an isometric view of a lens module in accordance with an exemplary embodiment.
Figure 2:
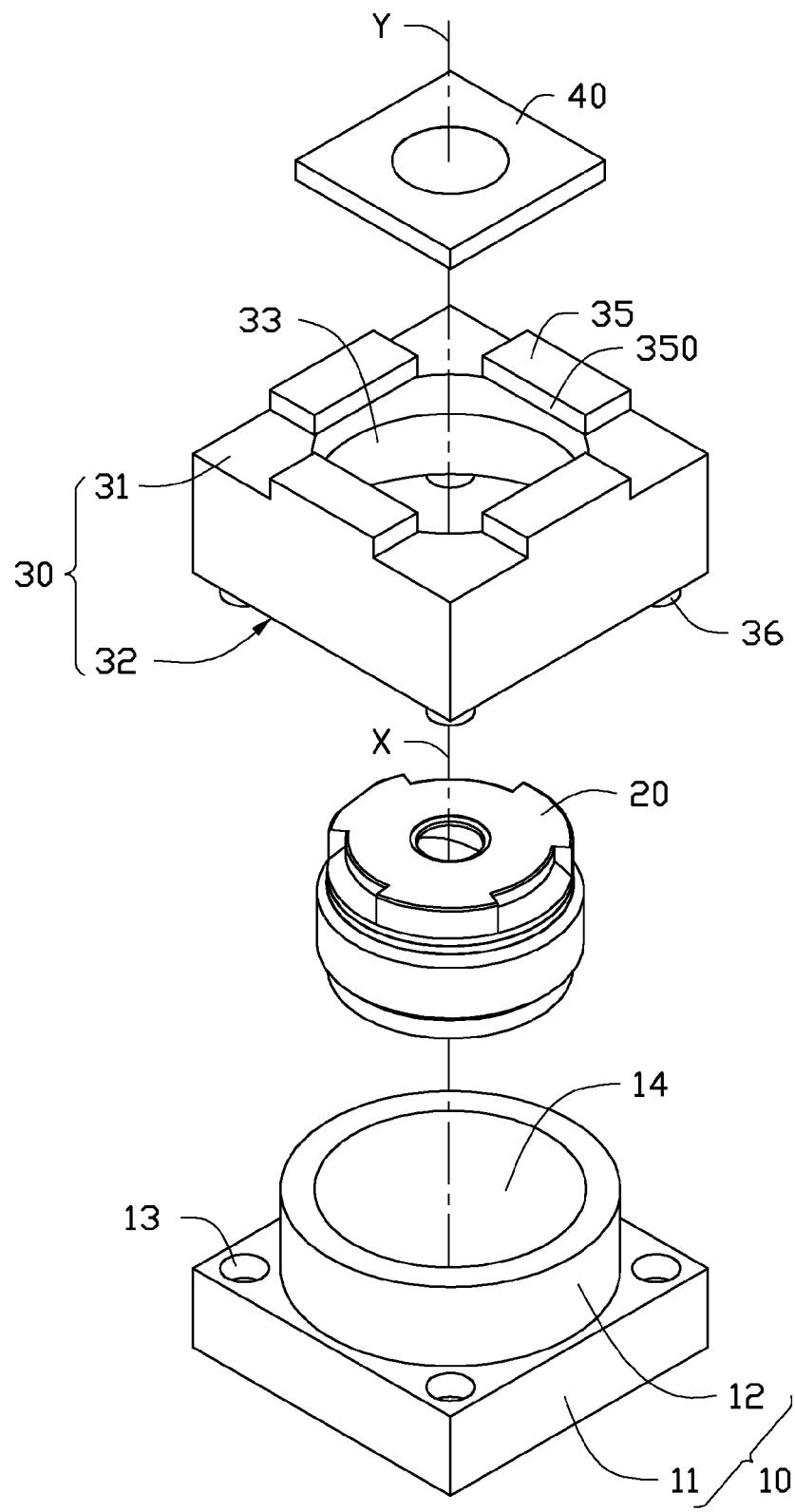
FIG. 2 is an exploded, isometric view of the lens module of FIG. 1.

Referring to FIGS. 1-2, a lens module 1 in accordance with an exemplary embodiment is illustrated. The lens module 1 includes a holder 10, a barrel 20 having a first optical axis X, a frame 30 fixed to the holder 10, and a square lens 40 having a second optical axis Y. The frame 30 is used to align the first optical axis X with the second optical axis Y. In the embodiment, the square lens 40 is a liquid crystal lens with a variable focal length or a filter.

The holder 10 includes a base 11 and a protrusion 12 protruding from the base 11. The base 11 defines four positioning holes 13 around the protrusion 12. The protrusion 12 defines a cavity 14 for receiving the barrel 20 therein.

The barrel 20 includes a number of optical lenses (not shown) which are received therein, and the optical lenses have the first optical axis X.

The frame 30 includes a first side surface 31, a second opposite side surface 32 facing the holder 10, and defining a through hole extending through the first side surface 31 and the second side surface 32. The first side surface 31 includes four blocking portions 35 protruding therefrom. In the embodiment, the blocking portion 35 includes a vertical third side surface 350 above the through hole 33. The second side surface 32 includes four positioning posts 36 corresponding to the four positioning holes 13.

The barrel 20 is received in the cavity 14 of the holder 10, and the frame 30 is coupled to the holder 10 with the positioning posts 36 retained within the positioning holes 13. Thus, an imaginary axis of the through hole 14 is aligned with an imaginary axis of the through hole 33 by the precise engagement between the positioning posts 36 and the positioning holes 13. The lateral surface of the barrel 20 mates with the inner side surface of the cavity 14, which enables the optical axis X of the barrel 20 to be aligned exactly with the imaginary axis of the cavity 14. The actual axis X of the barrel 20 thus aligns in all respect with the imaginary axis of the through hole 33 of the frame 30.

Figure 3:
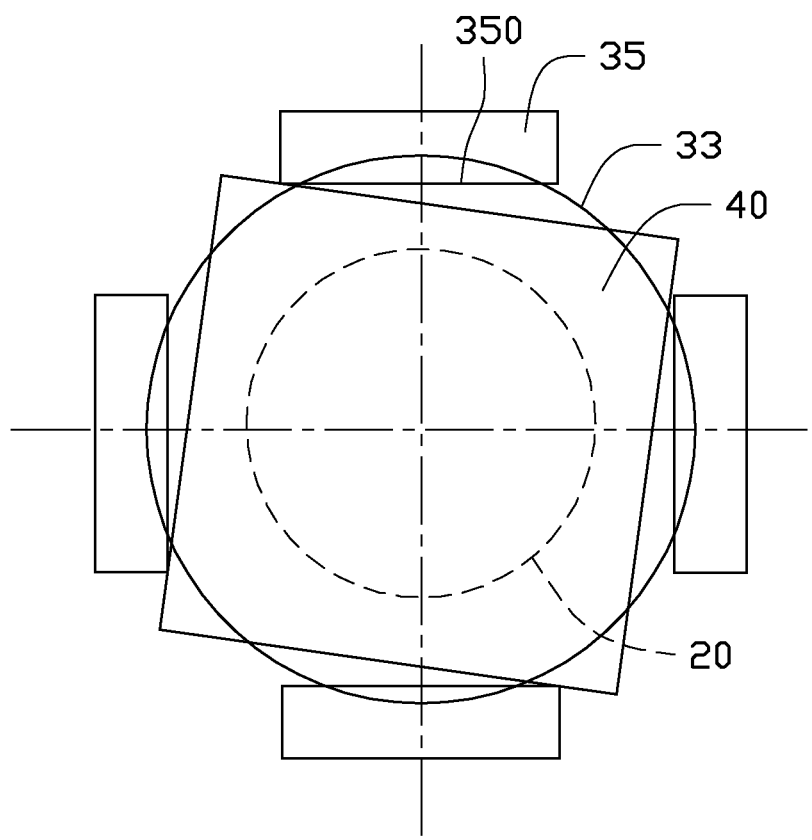
FIG. 3 is a schematic view of the lens module of FIG. 1.

Referring also to FIG. 3, when in assembly, the square lens 40 is manually placed onto the first side surface 31. Then, the square lens 40 is rotated till four side surfaces of the square lens 40 respectively contacts the third side surfaces 350 of the four blocking portions 35, which aligns the second optical axis Y with the imaginary axis of the through hole 33. Thus, the second optical axis Y of the lens 40 is perfectly aligned with the first optical axis X of the barrel 20. In the embodiment, the square lens 40 is secured to the frame 30 using glue applied to the side surfaces of the square lens 40 and the third side surface 350 of the four blocking member 35.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A lens module comprising:
a holder defining a cavity;
a barrel received within the cavity and comprising a first optical axis X aligned with an imaginary axis of the cavity;
a frame defining a through hole and comprising a plurality of blocking portions, wherein the frame is coupled to the holder, and an imaginary axis of the through hole is aligned with the axis line of the cavity; and
a square lens comprising a second optical axis Y, wherein the square lens is connected to the frame and comprises four side surfaces respectively contacting the plurality of blocking portions such that the second optical axis Y aligns with the imaginary axis of the through hole.

2. The lens module as described in claim 1, wherein the frame comprises a first side surface and a second, opposite second surface facing the holder, the through hole extends through the first side surface and the second side surface, and the plurality of blocking portions protrude from the first surface.

3. The lens module as described in claim 2, wherein the holder includes a base and a protrusion protruding from the base and defining the cavity.

4. The lens module as described in claim 3, wherein the base defines four positioning holes, and the second surface of the holder forms four positioning posts respectively retained within the four positioning holes, which aligns the imaginary axis of the cavity with the imaginary axis of the through hole.

5. The lens module as described in claim 1, wherein the square lens is a liquid crystal lens with a variable focal length.

6. The lens module as described in claim 1, wherein the square lens is a filter.

7. The lens module as described in claim 1, wherein the plurality of blocking portions each comprise a third vertical side surface, and the square lens is secured to the frame using glue applied to the side surfaces of the square lens and the third side surface.

* * * * *